United States Patent
Urish

[15] 3,657,633
[45] Apr. 18, 1972

[54] MULTIPLE BRIDGE DIFFERENTIAL VOLTAGE STATIC INVERTER

[72] Inventor: Joseph M. Urish, Lima, Ohio
[73] Assignee: Westinghouse Electric Corporation, Pittsburgh, Pa.
[22] Filed: Nov. 27, 1970
[21] Appl. No.: 93,143

[52] U.S. Cl. ........................... 321/9 A, 321/5, 321/27 MS
[51] Int. Cl. ........................................................ H02m 1/12
[58] Field of Search ............... 321/5, 9, 9 A, 27, 27 MS, 45, 321/DIG. 1

[56] References Cited

UNITED STATES PATENTS

| 3,523,236 | 8/1970 | Howell et al ......................... 321/9 |
| 3,430,073 | 2/1969 | Leonard ............................ 307/260 |
| 3,346,794 | 10/1967 | Stemmler .......................... 321/9 X |
| 3,248,635 | 4/1966 | Corey ............................. 321/27 MS |
| 3,309,600 | 3/1967 | Wellford ......................... 321/5 X |
| 3,491,250 | 1/1970 | Shoh .............................. 321/27 X |

Primary Examiner—William M. Shoop, Jr.
Attorney—F. H. Henson, Charles F. Renz and Michael P. Lynch

[57] ABSTRACT

This invention relates to a static inverter circuit utilizing a combination of two or more bridge type inverter circuits interconnected by means of movable tap interphase transformers for developing a stepwise inverter output waveform with little harmonic distortion. Through selective positioning of the taps and proper sequential actuation of the power switch elements comprising the bridge circuits, a stepwise sinewave inverter output waveform can be generated.

11 Claims, 6 Drawing Figures

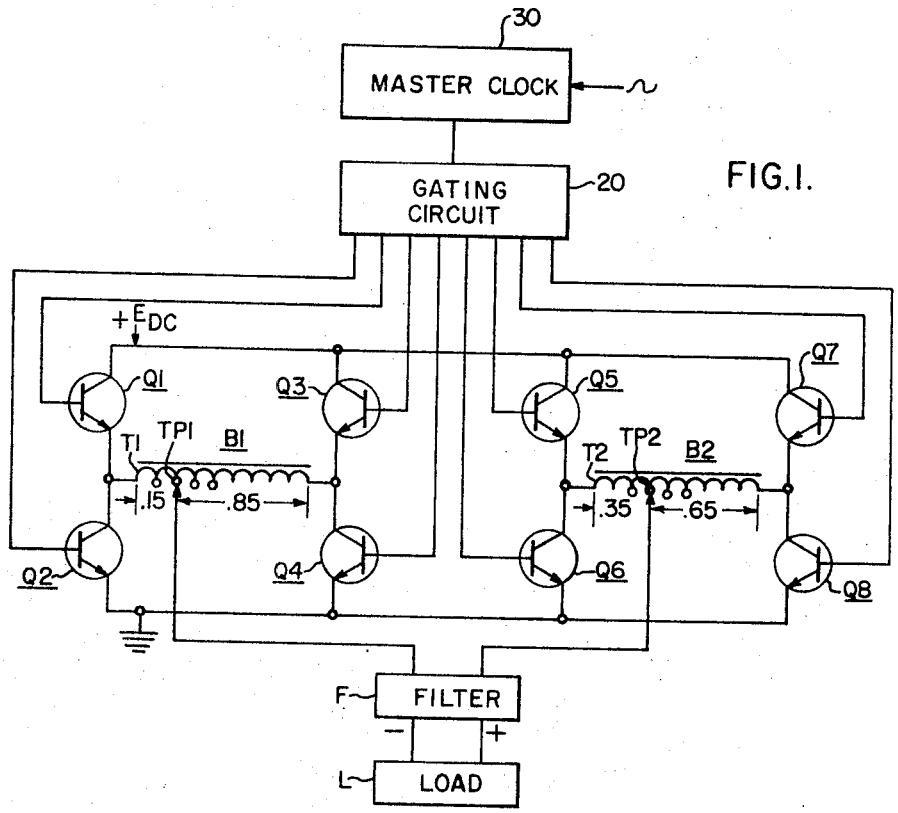
FIG.1.
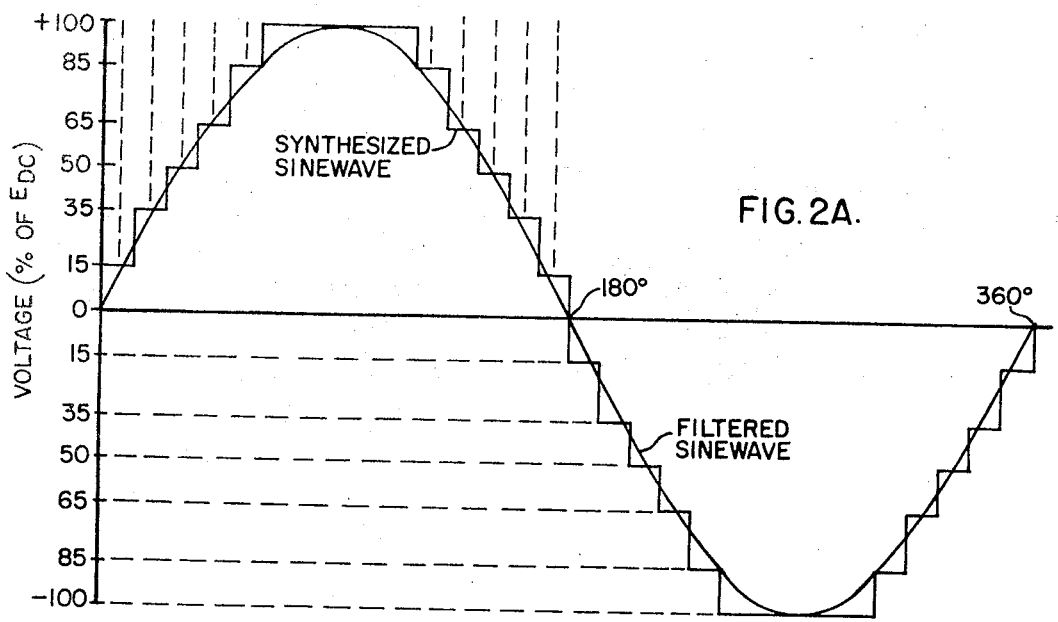
FIG.2B.
FIG.2A.

MULTIPLE BRIDGE DIFFERENTIAL VOLTAGE STATIC INVERTER

BACKGROUND OF THE INVENTION

State of the art static inverters for generating sinewave voltage waveforms generally employ techniques utilizing either high frequency bridges with modulation at the fundamental output frequency, or a harmonic neutralized scheme requiring many individual inverter stages. While both of these techniques provide a desired output voltage, each has disadvantages. These disadvantages include the cost of high speed switching elements required in the high frequency bridge, and the requirement for individual output transformers for each of the inverter stages of the harmonic neutralized scheme. This latter technique is described in U.S. Pat. No. 3,491,282 issued to T. M. Heinrich et al., and assigned to the assignee of the present invention.

SUMMARY OF THE INVENTION

The invention comprises a multiple bridge differential static inverter circuit including a movable tap interphase autotransformer associated with each bridge circuit. The tap positions of the interphase transformers are selected such that a predetermined actuation sequence of the switching elements of the bridge circuits will operate to combine voltages corresponding to various combinations of the tapped sections of the interphase transformers to generate a stepwise sinewave voltage output between the taps of interphase transformers. This scheme permits the use of low cost switching device i.e., power transistors due to the relatively low switching frequencies required. Furthermore this scheme limits the time within which the interphase transformers are required to support full voltage. This minimizes the volt second requirements of the interphase transformers thus permitting the use of relatively small transformers.

The invention will become more readily apparent from the following exemplary description in connection with the accompanying drawing.

DESCRIPTION OF THE DRAWING

FIG. 1 is a schematic illustration of the static inverter embodying the invention;

FIGS. 2A, 2B and 2C graphically illustrate the operation of the static inverter of FIG. 1.

DESCRIPTION OF THE PREFERRED EMBODIMENT

Referring to FIG. 1 there is illustrated a multiple bridge differential inverter circuit 10 comprised of full bridge circuits B1 and B2 and interphase autotransformers T1 and T2 with movable taps TP1 and TP2 connected across an electrical load L. The conduction of the switching elements of the bridge circuits B1 and B2, herein illustrated to be transistors Q1–Q4, and Q5–Q8 respectively, is controlled by a programmed transistor gating circuit 20 in response to the clocking pulses generated by a master clock 30.

The transformer ratio selected by the positioning of the taps TP1 and TP2 in conjunction with the transistor gating sequence established by the gating circuit 20 determines the composite voltage waveform supplied to the load L.

Figure 2C:
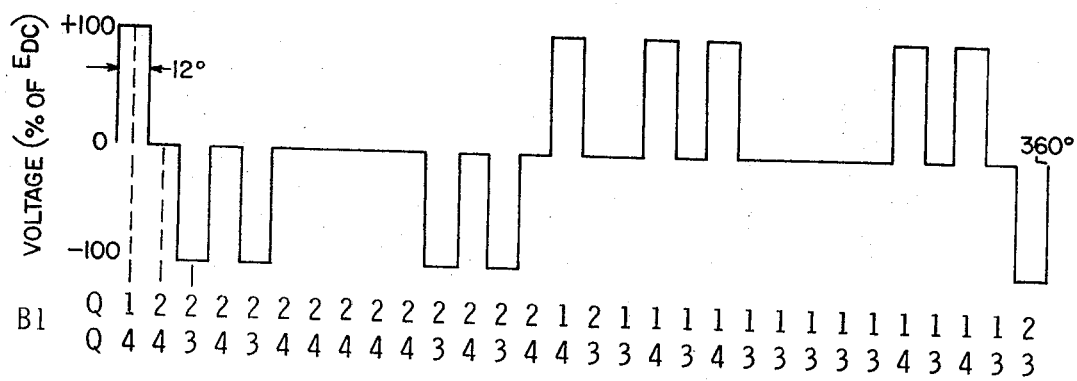

Illustrating the capabilities of the differential inverter circuit 10 let us assume that the tap TP1 is positioned to establish the ratio 15:85 for transformer T1 as illustrated in FIG. 1, and a tap TP2 is positioned to establish the ratio 35:65 for the transformer T2. These tap positions represent but one set of tap positions. It is apparent that numerous combinations are available. With these ratios, intermediate voltage steps of 15%, 35%, 50%, 65%, 85% and 100% of full input voltage $E_{DC}$ with respect to ground can be developed across the load L. A stepwise sinewave of the type illustrated in FIG. 2A can be synthesized by the transistor gating sequence tabulated in FIG. 2B. For instance, the 15% $E_{DC}$ voltage step of the positive half cycle of the waveform of FIG. 2A is provided by gating transistors Q1 and Q4 of the bridge circuit B1, and transistors Q5 and Q7 of the bridge circuit B2. This gating sequence establishes an 85% $E_{DC}$ voltage at the tap TP1, a 100% $E_{DC}$ voltage at the tap TP2. A resulting net differential output voltage across the load L of +15% $E_{DC}$ according to the polarity indications shown. The 15% $E_{DC}$ voltage step of the negative half cycle is provided by gating transistors Q2 and Q3 of the bridge circuit B1, and transistors Q6 and Q8 of the bridge circuit B2. This gating sequence establishes a voltage of 15% $E_{DC}$ at the tap TP1, ground potential at tap TP2 and a net differential voltage across the load of −15% $E_{DC}$. The remaining voltage steps of the waveform of FIG. 2A are developed in like manner according to the corresponding transistor gating sequences of FIG. 2B.

While the clock frequency of the gating circuit 20 is 30 times the output frequency, as is apparent from a count of gating sequences of FIG. 2B required to generate the waveform of FIG. 2A, it is also apparent from the gating sequences of the FIG. 2B that the individual transistor switches of the bridge circuits operate at a much lower clocking frequency, thus minimizing switching losses.

Furthermore, the individual transistor switches are never required to carry full load as indicated in the following tabulation:

Transistor switches Q1 & Q2 carry 85 percent full load current

Transistor switches Q3 & Q4 carry 15 percent full load current

Transistor switches Q5 & Q6 carry 65 percent full load current

Transistor switches Q7 & Q8 carry 35 percent full load current

This permits the design of inverters of large KVA rating without the cost and complexity of parallel connected switching elements. Further examination of the transistor gating sequences of FIG. 2B discloses that the interphase transformers T1 and T2 are required to support full voltage, 100% $E_{DC}$, for only 48° of the 360° of a single cycle. This is apparent in regards to transformer T1 as positive transformer volt seconds are developed during actuation of transistor switches Q1 and Q4, negative transformer volt seconds are developed during actuation of transistor switches Q2 and Q3, and zero transformer volt seconds are developed during actuation of transistor switches Q1 and Q3, or Q2 and Q4. This is apparent from the graphical illustration in FIG. 2C which depicts the above switching conditions. Inasmuch as there are 30 switching segments in each cycle of the gating sequence of FIG. 2B, each segment represents 12°. The fact that transformer T1 is required to support full voltage for only four consecutive segments conforms that the transformer T1 is required to support full voltage for 48° of the 360° cycle. This same analysis applies to transformer T2. This reduces the volt seconds requirement of the transformer windings considerably from that required in a transformer subjected continuously to full voltage, and in essence means that the multiple bridge differential inverter circuit 10 can provide a 400 Hz output voltage waveform while utilizing an interphase transformer equivalent in size to a 1.6 KHz transformer.

In addition to providing an efficient technique for developing a sinewave voltage output, the multiple bridge differential inverter circuit 10 synthesizes a sinewave with very little harmonic distortion as indicated below:

| | Peak magnitude Peak/DC ratio | Ratio of harmonic to fundamental × 100% |
|---|---|---|
| (fundamental) | 1.035 | 0 |
| 3rd Harmonic | 0 | 0 |
| 5th Harmonic | 0 | 0 |
| 7th Harmonic | 0.0243 | 2.35% |
| 9th Harmonic | 0 | 0 |
| 11th Harmonic | 0.00176 | 0.17% |
| 13th Harmonic | 0.0086 | 0.83% |

The modulation index of circuit 10 is 1.035. This index represents the ratio of the value of the source voltage $E_{DC}$ to the peak value of the generated sinewave inverter output waveform. A modulation index seldom exceeds 1.1. The higher the modulation index the lower the required value of the DC source voltage needed to generate the desired sinewave output. Furthermore, the magnitude of the voltage which the transistor switches are required to withstand is minimized in a circuit exhibiting an optimum modulation index.

An output filter F may be utilized to filter the synthesized sinewave of FIG. 2A into a good quality sinewave.

Figure 3:
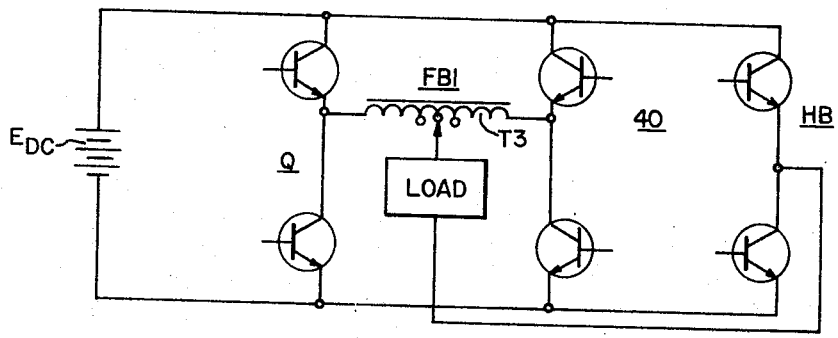
FIGS. 3 and 4 are schematic illustrations of alternate embodiments of the invention.
Figure 4:
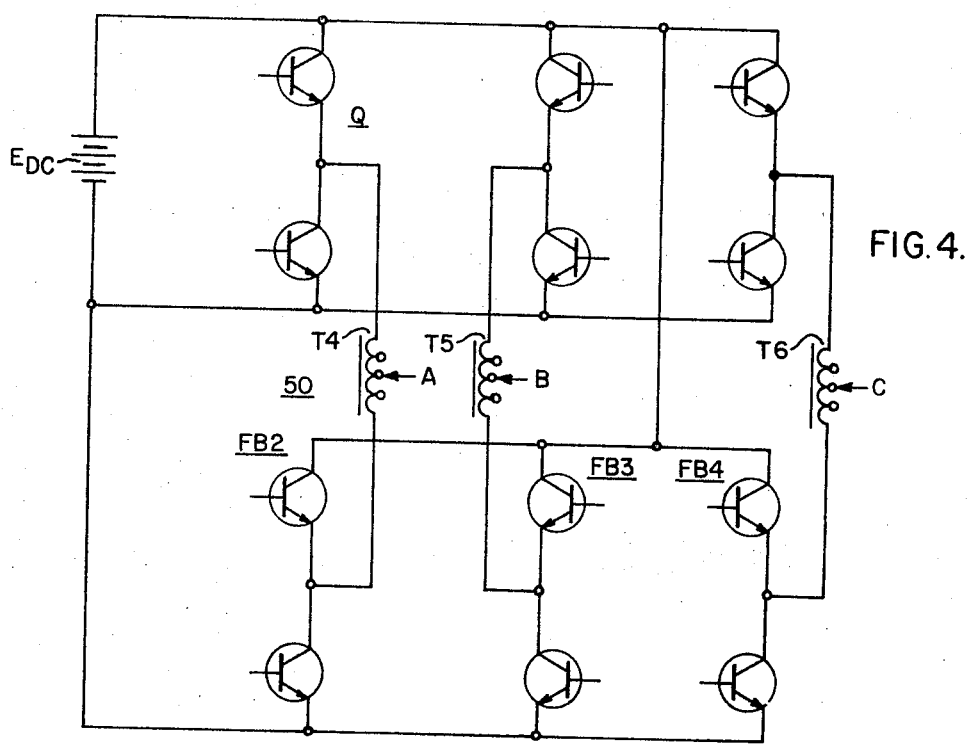

Additional embodiments of the invention are schematically illustrated in FIGS. 3 and 4.

The multiple bridge differential voltage inverter circuit 40 of FIG. 3 comprises a full bridge circuit FB1 and a half bridge circuit HB with the movable tap output of the interphase transformer T3 applying the output of the full bridge FB to terminal of the load L and the output of the half bridge HB being applied to the other terminal of the load L. The number voltage steps comprising the stepwise output waveform of circuit 40 will be less than the number generated by the circuit 10 of FIG. 1 due to the reduced number of switching combinations of the transistor switches Q of circuit 40.

The multiple bridge differential voltage inverter circuit 50 of FIG. 4 is a three phase inverter circuit comprising full bridge circuits FB2, FB3 and FB4 and their respective interphase transformers T4, T5 and T6. A synthesized stepwise line-line sinewave voltage is developed among the respective transformer tap positions A, B and C in accordance with the proper tap positioning and transistor switch gating sequence as described above. Due to the added requirement of maintaining proper phase relationships of the voltage waveforms of a three phase inverter circuit and also due to the voltage contribution of each bridge to the waveform of the other bridges, the tap position of the transformers T4, T5 and T6 must be the same.

It is apparent from the above that the basic concept of the differential voltage static inverter can be applied to numerous multiple bridge inverter circuits in addition to those illustrated.

I claim as my invention:

1. In an electrical inverter apparatus operative with a direct current potential source for supplying alternating current potential to a load, the combination of, a plurality of inverter power stages, each including a plurality of conduction controlled switching devices for controllably completing a circuit to said load, an interphase transformer operatively coupled to the output of each of said power stages, each of said interphase transformers having taps positioned to provide a plurality of predetermined unequal output voltage values corresponding to prescribed percentages of said direct current potential, and circuit means for controlling conduction of said switching devices to arithmetically combine in a sequential manner various of said voltage values of said interphase transformers to produce a pattern of voltage pulses of various magnitudes forming a predetermined voltage waveform at said load.

2. In an electrical inverter apparatus as claimed in claim 1 wherein said plurality of power stages comprises a first and second inverter bridge circuit means.

3. In an electrical inverter apparatus as claimed in claim 2 wherein said first inverter bridge circuit means comprises a full bridge circuit with said conduction controlled switching devices positioned in the legs thereof, and including an interphase output transformer having a movable tap for dividing the winding of said interphase output transformer into two sections, said movable tap being operatively connected to said first terminal of said load, said movable tap being positioned to establish a predetermined voltage magnitude across each of said sections.

4. In an electrical inverter apparatus as claimed in claim 3 wherein said second inverter bridge circuit comprises a full bridge with said conduction controlled switching devices positioned in the legs thereof, and including an interphase output transformer having a movable tap for dividing the winding of said interphase output transformer into two sections, said movable tap being operatively connected to said second terminal of said load, said movable tap being positioned to establish a predetermined voltage magnitude across each of said sections.

5. In an electrical inverter apparatus as claimed in claim 4 wherein the magnitude of the voltages established across each of said interphase output transformers equals the magnitude of the voltage supplied by said direct current potential source.

6. In an electrical inverter apparatus as claimed in claim 1 wherein said pattern of voltage pulses approximates a sinewave having both positive and negative half cycles and exhibiting little harmonic content.

7. In an electrical inverter apparatus as claimed in claim 6 including a filter means operatively connected between the outputs of said first and second inverter bridge circuit means and said load.

8. In an inverter apparatus operative with a source of direct current potential for supplying polyphase alternating current potential to a polyphase load, the combination of, multiple full bridge inverter circuit means, each including conduction control switching devices in the legs thereof, the number of full bridge inverter circuit means corresponding to the number of output phases of said inverter apparatus, each full bridge inverter circuit means including an interphase output transformer having a movable tap for dividing the winding of said interphase output transformer into two sections, said movable tap being positioned to establish a different predetermined voltage magnitude across each of said sections, said movable taps of said interphase output transformers being operatively connected to said polyphase load, and circuit means for controlling the conduction of the conduction control switching devices of the respective full bridge inverter circuits to arithmetically combine in a sequential manner various of said predetermined voltage magnitudes to produce a pattern of voltage pulses of various magnitudes to form a predetermined voltage waveform at said load.

9. In an inverter apparatus as claimed in claim 7 wherein the positioning of the movable taps of the respective interphase output transformers is identical.

10. In an electrical inverter apparatus as claimed in claim 3 wherein the magnitude of the predetermined voltage developed across each of the sections of said interphase output transformers is different.

11. In an electrical inverter apparatus as claimed in claim 10 wherein the magnitudes of said predetermined voltages correspond to 15 percent of the direct current potential, 35 percent of the direct current potential, 65 percent of the direct current potential and 85 percent of the direct current potential, respectively.

* * * * *